Sept. 19, 1961         H. TROTTER, JR         3,000,307
DEVICE FOR CORRECTING THE COURSE OF A MISSILE
Filed Aug. 4, 1953         2 Sheets-Sheet 1
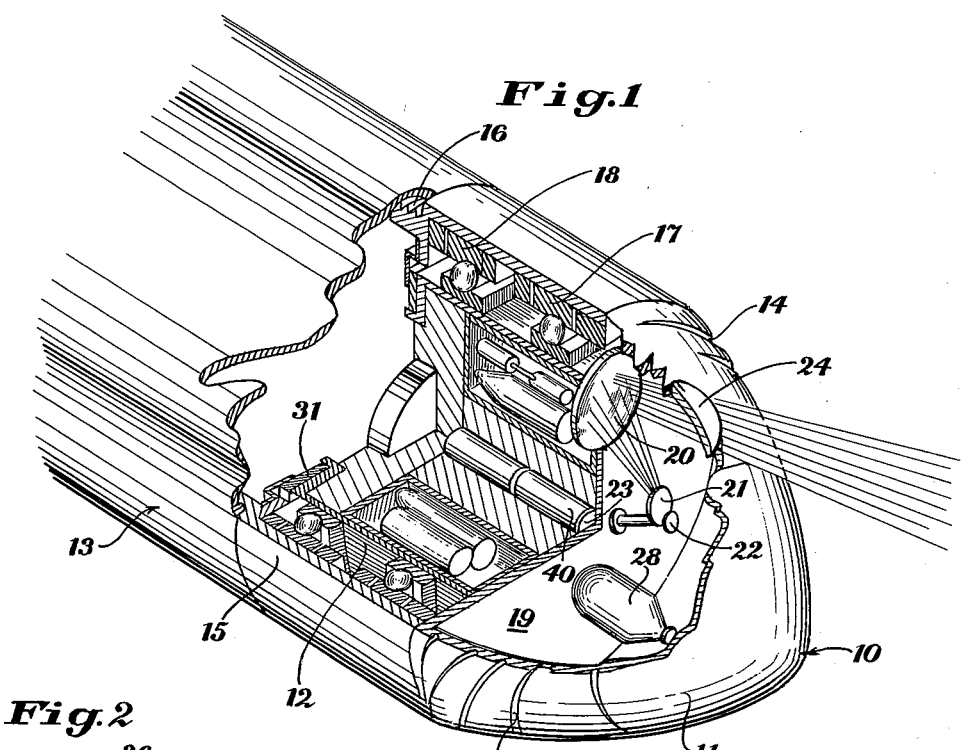
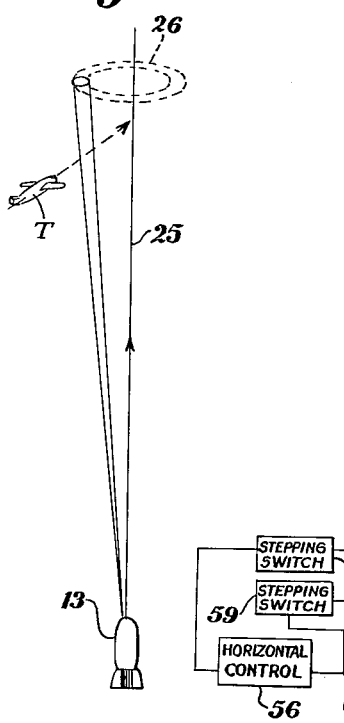
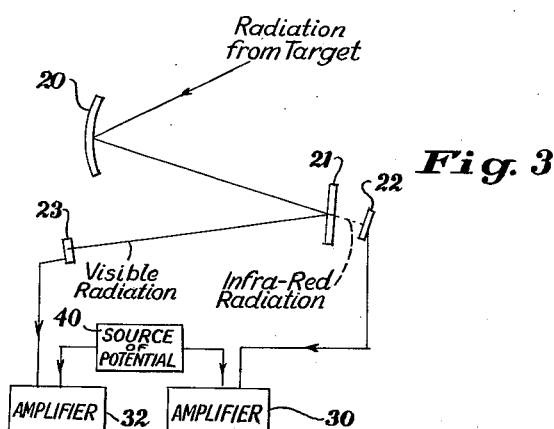
Herbert Trotter, Jr.
INVENTOR.

Sept. 19, 1961   H. TROTTER, JR   3,000,307
DEVICE FOR CORRECTING THE COURSE OF A MISSILE
Filed Aug. 4, 1953   2 Sheets-Sheet 2
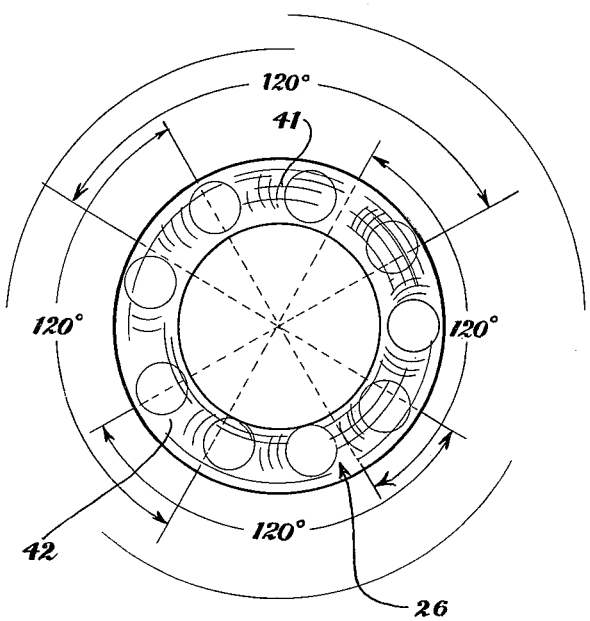
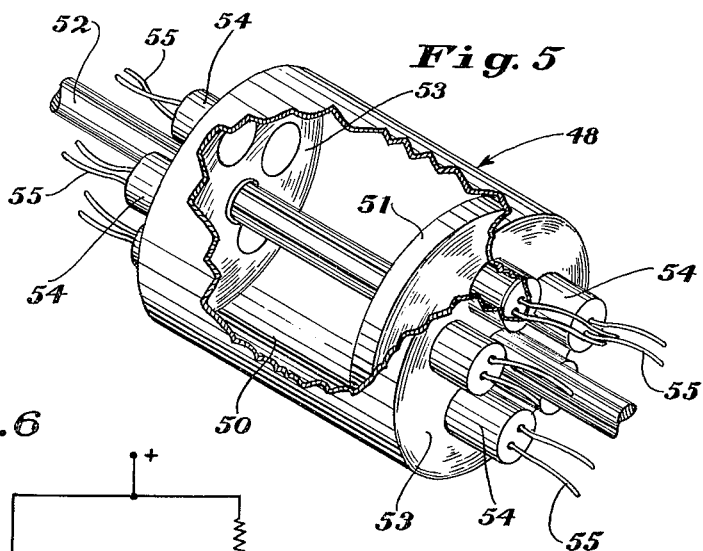
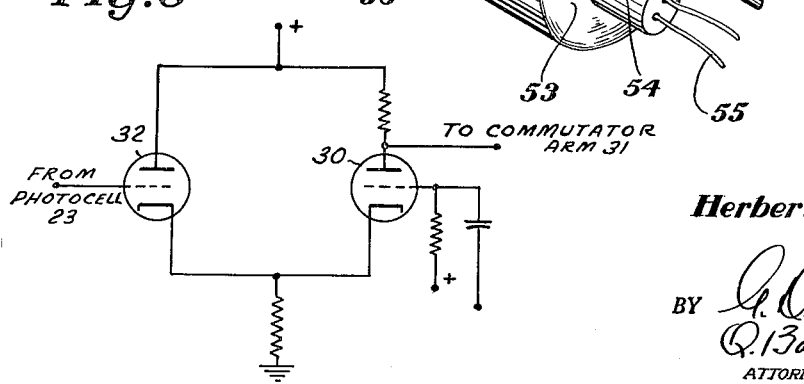
Herbert Trotter, Jr.
INVENTOR.

United States Patent Office 3,000,307
Patented Sept. 19, 1961

3,000,307
DEVICE FOR CORRECTING THE COURSE OF A MISSILE
Herbert Trotter, Jr., Rochester, N.Y., assignor, by mesne assignments, to the United States of America as represented by the Secretary of the Navy
Filed Aug. 4, 1953, Ser. No. 374,163
4 Claims. (Cl. 102—50)

This invention relates to non-rotating projectiles and more particularly to a device for varying or correcting the course thereof when in flight due to changes in direction and speed of the target, or errors in the launching.

Various types of mechanisms have been devised to alter the course of a missile once it has been launched or fired. In the case of guided missiles the controlling mechanism within the missile itself is extremely complicated as well as the external mechanism to which the controlling mechanism is responsive. A missile which is fully and automatically controlled once it has been launched or fired usually is responsive to a radio wave reflected from the target. Such an automatic control is also very complicated in that a mechanism is necessary for generating as well as propagating and receiving the reflected wave which must then be utilized through another mechanism for altering the course of the missile.

In the present invention such complicated mechanisms and electrical or electronic circuits are eliminated and an inexpensive device capable of mass production provides the intelligence to correct the course of the missile which may be either an air-to-air rocket or a gun-launched non-rotating projectile. The correcting system is responsive to the infrared radiation from the target and an automatic blocking device prevents the system from being affected by very high intensity visible radiation, such as the sun. The missile is provided with a head having air scoops for imparting rotation thereto in flight and has contained therein a scanning system, amplifier circuits and switching means for connecting the output of the amplifiers to the proper course-changing charge to be fired. The scanning system is angularly offset with respect to the axis of the missile and rotates with the head to scan a hollow conical zone about an axis coextensive with that of the missile. Filter means associated with the scanning system transmits the infrared radiation from a target in the zone to a detector and reflects the visible radiation to a light-sensitive device. An amplifier circuit obtaining a signal from the infrared detector has its output connected to a commutator rotatable with the head which, in turn, connects the output to a group of charges or detonators associated with each quadrant of the zone, a stepping switch being associated with each group of charges so that the electrical circuit is switched to the next detonator after each firing. In this way several corrections to the course of the missile can be made for each quadrant of the zone. The quadrant in which a charge is fired is determined by the quadrant in which a target is scanned or by the orientation of the infrared detecting means at the time the signal is given. In order to prevent firing of a charge by entry of high intensity visible radiation, such as the sun, in the zone, a second amplifier circuit is connected to the light-sensitive means and its output is utilized to block the output of the first amplifier as long as the high intensity visible radiation is present in such zone.

The primary object of the invention, is, therefore, to provide an intelligence system for correcting the course of a missile in which the system is responsive only to infrared radiation.

Another object of the invention is to provide an intelligence system for correcting the course of a missile which is responsive to infrared radiation emitted by the target and which is automatically inhibited by the high intensity visible radiation, such as from the sun.

Still another object of the invention is to provide an intelligence system for correcting the course of a missile in which a rotatable head has the scanning system, electrical circuits, and switching means mounted therein as a complete unit.

A further object of the invention is to provide an intelligence system for correcting the course of a missile in which a group of charges, associated with each quadrant of a hollow conical zone having an axis coextensive with that of the missile, are fired in accordance with the relation of a target to said quadrants and in response to the infrared radiation emitted by the target.

And still another object of the invention is to provide an intelligence system for correcting the course of a missile which is compact, capable of mass production, inexpensive to manufacture and effective in its use.

These and other objects and advantages will be apparent to those skilled in the art from the description which follows.

Reference is now made to the accompanying drawings in which like reference numerals designate like parts and wherein:

FIG. 1 is a perspective view, partially in section, of a missile embodying the invention and showing particularly the relation of the elements in the rotatable head of the missile;

FIG. 2 is a diagrammatic representation of the hollow conical zone which is scanned by the offset scanning system;

FIG. 3 is a diagrammatic representation of the scanning system and the electronic and electrical circuits associated therewith;

FIG. 4 is a diagrammatic representation of an arrangement in which the sections of scan can be greater than 90° by overlapping the sections;

FIG. 5 is a perspective view, broken away in part, and showing groups of charges arranged at each end of a cylinder and which when fired move the piston connected to the controls for altering the course of the missile; and FIG. 6 is a schematic amplifier circuit.

In FIG. 1, head 10 comprising nose 11 and sleeve 12 to form a single rotatable element is disclosed as mounted on the front end of missile 13 which can be an air-to-air rocket or a gun-launched projectile. Nose 11 is provided with air scoops 14 on the outer surface thereof for imparting rotation to the head when in flight. A sleeve 15 is secured by means of threads 16 to missile 13 and carries therein ball bearings 17 and 18, the inner races of said bearings being mounted on sleeve 12 secured in any well known manner to plate 19, which partitions head 10.

The scanning system comprises spherical mirror 20, filter 21, infrared detector 22 and light-sensitive means, or photocell 23. A window 24 is provided in nose 11 and the scanning system is angularly offset with respect to the axis of the missile and positioned so that the zone scanned is a hollow cone having an axis 25 coextensive with that of the missile, as shown in FIG. 2. This is accomplished by mounting the elements of the scanning system within nose 11 in such a manner as to be rotatable therewith. As illustrated in FIG. 2, mirror 20 scans a hollow conical zone 26 as head 10 is rotated by scoops 14 so that the entry of a target T, which is capable of emitting infrared radiation, into the zone is collected by said mirror and focused on infrared detector 22 of lead sulfide or similar material. Detector 22 is cooled to Dry Ice temperature by the expansion of gas from a cylinder 28 carried in the nose 11 and which is punctured upon launching of the missile in any suitable manner. The cooling of detector 22 will increase its sensitivity about 50 times above its room temperature value.

Filter 21 is arranged in front of detector 22 and is capable of transmitting the infrared radiation collected by mirror 20 to detector 22 and of reflecting high intensity visible radiation to a light-sensitive means or photocell 23. An amplifier circuit, designated by numeral 30 in FIG. 3, receives a signal from detector 22 upon entry of the target into zone 26 and the output thereof is connected to commutator 31 secured to the end of sleeve 12 and rotatable therewith. A second amplifier, designated by numeral 32, receives a signal from photocell 23 whenever any high intensity visible radiation is focused thereon by mirror 20, the output being utilized to inhibit or block amplifier 30. The sensitivity of cell 23 and the gain of amplifier 32 is such that the output of amplifier 32 will cause amplifier 30 to be driven to a cut off state to block any signal from the infrared detector 22 when an image such as that of the sun enters the scanned zone. For any other target, the output of amplifier 32 will have no effect.

Cell 23 and the tubes, condensers and resistors of amplifier circuits 30 and 32 are mounted in a well-known manner in sleeve 12, as shown in FIG. 1. Sleeve 12 also carries the power supply 40 in the form of reserve batteries which are energized by the breaking of a glass ampule to introduce an electrolyte into the battery at the time of launching.

In FIG. 4 a cross section of the space scanned by rotating mirror 20, filter 21, detector 22 and cell 23 is shown and is in the form of a ring due to the off-axis rotation as disclosed in FIG. 2. The sections of the scan in which a given correction is called for by the entry of a target into zone 26 can be equally divided into quadrants or may, as shown in FIG. 4, be of 120° sections which overlap to provide four zones 41 which provide a single correction and four zones 42 which provide a multiple correction.

The correcting means 48 disclosed in FIG. 5 comprises a cylinder 50 having a piston 51 on shaft 52 which is connected to the control surfaces or fins of the missile by any suitable linkage connecting shaft 52 with the control surface in any well-known manner. On each end plate 53 of cylinder 50 a plurality of electrical charges 54 are arranged and connected by leads 55 to commutator 31. The thickness of plate 53 under each charge is such that the pressure of the charge when fired will blow it out, the pressure then being exerted against piston 51 to move it axially for changing the position of the control surfaces and thereby altering the course of the missile. As indicated in FIG. 3, two such correcting means are provided, one as a horizontal control 56 and the other as a vertical control 57. For example, if correcting means 48 is considered as the horizontal control 56, detonators 54 at the right hand end can then serve to move the horizontal fin in one direction and those at the left end will then move the fin in the other direction, as determined by stepping switches 58 and 59. Inasmuch as a group of charges are arranged on each end plate 53 and more than one correction may be necessary, stepping switches 58, 59, 60 and 61 are associated with each group of charges to change the electrical contact to the next detonator after each correction made in its particular group. Such switches may be stepped either mechanically or electrically.

As long as a target is inside of zone 26, no correction of the missile takes place. When the target or a portion thereof enters zone 26, then the infrared radiation emited thereby is focused by mirror 20 on detector 22. Commutator 31 causes the output of amplifier 30 which is derived from the signal obtained from detector 22 to be connected to one of the several contacts 31a, 31b, 31c or 31d depending on the orientation of the scaning system with respect to the quadrants at the time the signal is received from the target and detector 22. A circuit is then completed through the proper stepping switch to fire one of the charges 54. In the event overlapping zones, as shown in FIG. 4, are used, appearance of the target in zones 41 would result in a single charge being fired whereas appearance in zones 42 would result in two charges being fired to give a correction which would be the resultant of a horizontal and vertical correction. In this instance additional contacts would of necessity need to be incorporated in commutator 31 which would be interconnected to both the horizontal and vertical controls 56 and 57, respectively. Any high intensity visible radiation, such as that emitted by the sun and apeparing in zone 26, is focused by mirror 20 on photocell 23, the visible radiation being reflected by filter 21, and the output of amplifier 32 is utilized to inhibit amplifier 30 thereby blocking any signal from detector 22. It is to be understood, of course, that as long as target T is within zone 26, the missile is "on target" and no control signal or correction is necessary. As a result, any signal derived from the high intensity visible radiation source is of no consequence at this particular time. If the target T and the high intensity visible radiation source should appear in the same zone 41 or 42 so that signals are transmitted by detectors 22 and cell 23 to amplifiers 30 and 32, respectively, then amplifier 32 will block the output of any signal from amplifier 30. However, target T will eventually assume a position with respect to the high intensity visible radiation source in one of zones 41 or 42 in which a signal is derived therefrom either before or after deriving a signal from the high intensity visible radiation source and correction can then be made to alter the missile path. Amplifier 30 has its gain peaked at 20–50 times the spin frequency of head 10 so that the entire system will readily respond to sudden charges in signal caused by intersecting the radiation from an air target rather than by the slow variation encountered on one revolution of the head.

Since other modifications and variations of the invention will be suggested and readily apparent to those skilled in the art, the scope of the invention is pointed out in the appended claims.

Having now particularly described my invention, what I desire to secure by Letters Patent of the United States and what I claim is:

1. A missile having a series of charges adapted to be fired in response to infrared radiation emitted by a target for varying the course thereof, a head provided with air scoops for imparting rotation thereto in flight, a scanning system within said head offset with respect to the axis of said missile and positioned to scan a hollow conical zone surrounding said axis, a circuit including an infrared detecting means associated with said scanning system and an amplifier circuit for receiving a signal from said detecting means upon entry of a target into said zone, means actuated by the output of said amplifier to fire a charge in accordance with the orientation of said detecting means at the time said signal is received, and a second circuit including a light-sensitive means associated with said scanning system and an amplifier circuit for receiving a signal from said light-sensitive means in response to the presence of high intensity visible radiation in said zone, the output of said second-mentioned amplifier circuit blocking the output signal from said first-mentioned amplifier circuit only when said target and said high intensity visible radiation are in said zone and are scanned simultaneously.

2. A missile having a series of charges adapted to be fired in response to infrared radiation emitted by a target for varying the course thereof, a head provided with air scoops for imparting rotation thereto in flight, a scanning system within said head angularly offset with respect to the axis of said missile and positioned to scan a hollow conical zone surrounding said axis, said system including filter means for transmitting infrared radiation and reflecting visible radiation, a circuit including an infrared detecting means associated with said filter means and an amplifier circuit for receiving a signal from said detecting means upon entry of a target into said zone, means actuated by the output of said amplifier to fire at least one of said charges in accordance with the orientation of said detecting means at the time said signal is received, and a second circuit including a light-sensitive means associated with said filter means and an amplifier circuit for receiving a signal from said light-sensitive means in response to the presence of visible radiation in said zone, the output of said second-mentioned amplifier circuit blocking the output signal from said first-mentioned amplifier circuit only when said target and said visible radiation are in said zone and are scanned simultaneously.

3. A missile having a group of charges associated with each quadrant of a hollow conical zone having an axis coextensive with the axis of said missile and adapted to be fired in accordance with the relation of a target to one of the quadrants of said zone and in response to the infrared radiation emitted by said target for varying the course of said missile, a head provided with air scoops for imparting rotation thereto in flight, a scanning system within said head offset with respect to the axis of said missile and positioned to scan said zone, a circuit including an infrared detecting means associated with said scanning system and an amplifier circuit for receiving a signal from said detecting means upon entry of a target into said zone, switching means rotatable with said head for selectively connecting the output of said amplifier circuit to the group of charges corresponding to the quadrant of said zone in which the target is detected, means actuated by the output of said amplifier circuit for firing one of said charges in the selected group, and a circuit including a light-sensitive means associated with said scanning system for detecting any visible radiation in said zone and a second amplifier circuit for receiving a signal from said light-sensitive means, the output of said second amplifier circuit blocking the output of said first-mentioned amplifier circuit only when said target and said visible radiation are in said zone and are scanned simultaneously.

4. A device for correcting the course of a missile in flight in response to the infrared radiation emitted from a target entering a hollow conical zone having an axis coextensive with the axis of said missile comprising course correcting means within said missile adapted to be fired in accordance with the position of said target within said zone, a head rotatably mounted on said missile and having air scoops on the outer surface thereof for imparting rotation to said head in flight, a scanning system rotatable with said head and mounted therein displaced with respect the axis of said missile for scanning said conical zone, filter means arranged in the path of said scanning system and rotatable therewith for transmitting infrared radiation and reflecting visible radiation, means arranged with respect to said filter means for detecting the infrared radiation emitted by a target within said conical zone, an amplifier circuit connected to said infrared radiation detecting means for deriving a signal therefrom, electrical means in the output circuit of said amplifier and rotatable with said head for switching the output of said amplifier between a plurality of contacts in accordance wtih the orientation of said infrared detecting means at the time said signal is received, means connected to said plurality of contacts and said course correcting means and actuated by said switching means in accordance with the orientation of said infrared detecting means for firing said course correcting means, light-responsive means arranged with respect to said filter means for detecting any high intensity visible radiation within said zone, and a second amplifier circuit connected to said light-sensitive means for deriving a signal therefrom, the output of said second amplifier blocking the output signal from said first-mentioned amplifier circuit only when said target and said high intensity visible radiation are in said zone and are scanned simultaneously.

References Cited in the file of this patent

UNITED STATES PATENTS

| | | |
|---|---|---|
| 2,415,348 | Haigney | Feb. 4, 1947 |
| 2,421,085 | Rylsky | May 27, 1947 |
| 2,424,193 | Rost et al. | July 15, 1947 |
| 2,520,433 | Robinson | Aug. 29, 1950 |

FOREIGN PATENTS

| | | |
|---|---|---|
| 352,035 | Great Britain | June 22, 1931 |
| 836,555 | France | Oct. 17, 1938 |